US012706346B2

(12) United States Patent
Sakagawa et al.

(10) Patent No.: US 12,706,346 B2
(45) Date of Patent: Aug. 11, 2026

(54) BATTERY PACK

(71) Applicant: Panasonic Intellectual Property Management Co., Ltd., Osaka (JP)

(72) Inventors: Yasuaki Sakagawa, Hyogo (JP); Keisuke Shimizu, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 710 days.

(21) Appl. No.: 18/040,292

(22) PCT Filed: Sep. 13, 2021

(86) PCT No.: PCT/JP2021/033482
§ 371 (c)(1),
(2) Date: Feb. 2, 2023

(87) PCT Pub. No.: WO2022/070853
PCT Pub. Date: Apr. 7, 2022

(65) Prior Publication Data

US 2023/0291065 A1 Sep. 14, 2023

(30) Foreign Application Priority Data

Sep. 30, 2020 (JP) ................................ 2020-164771

(51) Int. Cl.
*H01M 50/30* (2021.01)
*H01M 50/342* (2021.01)

(52) U.S. Cl.
CPC .............................. *H01M 50/3425* (2021.01)

(58) Field of Classification Search
CPC ... H01M 50/30; H01M 50/34; H01M 50/3425
See application file for complete search history.

(56) References Cited

U.S. PATENT DOCUMENTS 1,151,077 A * 8/1915 Willard .............. H01M 50/308 429/79
1,366,298 A * 1/1921 Teitelbaum ............ H01M 6/06 137/849

(Continued)

FOREIGN PATENT DOCUMENTS

DE 112018004843 T5 6/2020
EP 3062367 A1 8/2016

(Continued)

OTHER PUBLICATIONS

International Search Report of PCT application No. PCT/JP2021/033482 dated Nov. 22, 2021.

(Continued)

*Primary Examiner* — Kenneth J Douyette
(74) *Attorney, Agent, or Firm* — RIMON P.C.

(57) ABSTRACT

A battery pack according to an aspect of the present disclosure includes a secondary battery and a battery case that houses the secondary battery. The battery case includes an exhaust section that exhausts gas exhausted from the secondary battery to outside of the battery case. The exhaust section includes at least one slit that is opened along with deformation of the exhaust section occurring in accordance with an increase in pressure in the battery case. In the exhaust section, the slits preferably reversibly operate due to the pressure in the battery case.

11 Claims, 4 Drawing Sheets

(56) References Cited

U.S. PATENT DOCUMENTS

| | | | | |
|---|---|---|---|---|
| 4,507,368 | A * | 3/1985 | Hashimoto | H01M 50/213 429/94 |
| 5,362,577 | A | 11/1994 | Pedicini | |
| 5,538,807 | A | 7/1996 | Hagiuda | |
| 9,231,237 | B2 | 1/2016 | Shimizu et al. | |
| 2009/0098443 | A1 | 4/2009 | Yamamoto et al. | |
| 2010/0032039 | A1 | 2/2010 | Nemoto et al. | |
| 2012/0114993 | A1 | 5/2012 | Park et al. | |
| 2015/0072184 | A1 | 3/2015 | Kusunoki et al. | |
| 2018/0261872 | A1 | 9/2018 | Satoh | |
| 2020/0303702 | A1 | 9/2020 | Nakamura et al. | |
| 2020/0395582 | A1 | 12/2020 | Ogawa | |

FOREIGN PATENT DOCUMENTS

| | | | | |
|---|---|---|---|---|
| JP | 60-147157 | U | 9/1985 | |
| JP | 63-152161 | U | 10/1988 | |
| JP | 9-500480 | A | 1/1997 | |
| JP | 2009-099301 | | 5/2009 | |
| JP | 2009-146812 | | 7/2009 | |
| JP | 2012-104471 | A | 5/2012 | |
| JP | 2012-199186 | | 10/2012 | |
| JP | 2014-041841 | | 3/2014 | |
| JP | 2014-107178 | | 6/2014 | |
| JP | 2015-056323 | A | 3/2015 | |
| WO | 2008/111356 | A1 | 9/2008 | |
| WO | 2016/076417 | | 5/2016 | |
| WO | WO-2019044633 | A1 * | 3/2019 | H01M 50/3425 |

OTHER PUBLICATIONS

The EPC Office Action dated Mar. 25, 2024 for the related European Patent Application No. 21875155.0.

English Translation of Chinese Search Report dated Apr. 2, 2025 for the related Chinese Patent Application No. 202180050634.6.

* cited by examiner

BATTERY PACK

CROSS-REFERENCE TO RELATED APPLICATIONS

This application is a U.S. national stage application of the PCT International Application No. PCT/JP2021/033482 filed on Sep. 13, 2021, which claims the benefit of foreign priority of Japanese patent application No. 2020-164771 filed on Sep. 30, 2020, the contents all of which are incorporated herein by reference.

TECHNICAL FIELD

The present disclosure relates to a battery pack, and more particularly to a battery pack with an exhaust section.

BACKGROUND ART

A battery pack is required to be sealable in order to protect a secondary battery housed inside from dust and water. In addition, since the secondary battery may generate gas during abnormality, the battery pack is also required to have a gas exhaust function in order to prevent rupture. PTL 1 discloses a battery pack in which a battery case with a seal member sandwiched between an upper lid and a lower lid is used to ensure sealability. During abnormality, the seal member is dissolved by the heat of gas generated from a secondary battery to form an exhaust path.

CITATION LIST

Patent Literature

PTL 1: International Patent Application Publication No. 2016/076417

SUMMARY OF THE INVENTION

In the battery pack disclosed in PTL 1, it takes time to form the exhaust path, and thus there is a possibility that exhaust cannot happen in time when gas is rapidly released from the secondary battery.

Therefore, an object of the present disclosure is to provide a battery pack that can be exhausted in accordance with an increase in internal pressure.

A battery pack according to an aspect of the present disclosure includes a secondary battery and a battery case that houses the secondary battery. The battery case includes an exhaust section that exhausts gas exhausted from the secondary battery to outside of the battery case. The exhaust section includes at least one slit that is opened along with deformation of the exhaust section occurring in accordance with an increase in pressure in the battery case.

According to the battery pack of an aspect of the present disclosure, it is possible to normally seal the inside of the battery case so as to protect the inside of the battery case from dust and water, and to suppress rupture of the battery case during abnormality.

Figure 4:
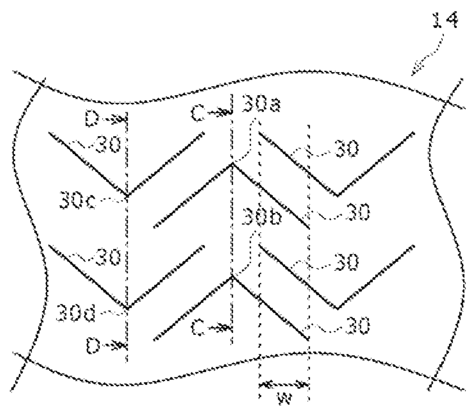
FIG. 4 is an enlarged view of a part of an exhaust section in an example of the exemplary embodiment.
Figure 5:
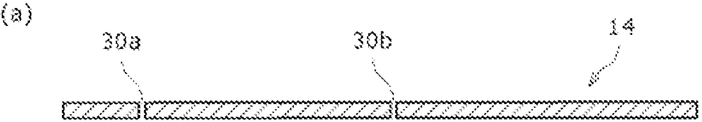
Figure 5:
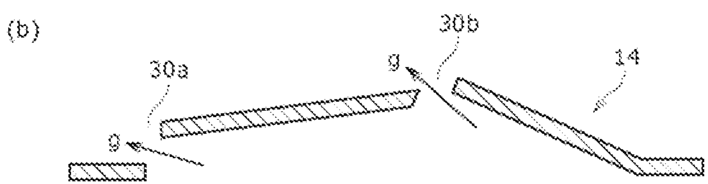
Figure 5:
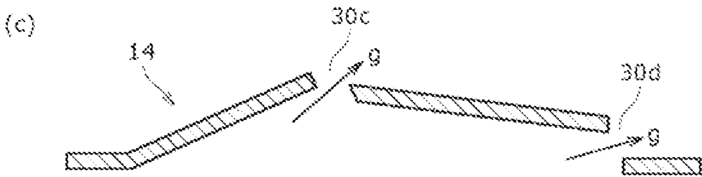

Parts (a) and (b) of FIG. 5 are cross-sectional views taken along line C-C of FIG. 4, in which (a) illustrates a normal state in which the pressure in a battery case is low, and (b) illustrates an abnormal state in which the pressure in the battery case has increased. Part (c) of FIG. 5 is a cross-sectional view taken along line D-D of FIG. 4 in an abnormal state where the pressure in the battery case has increased.

Figure 6:
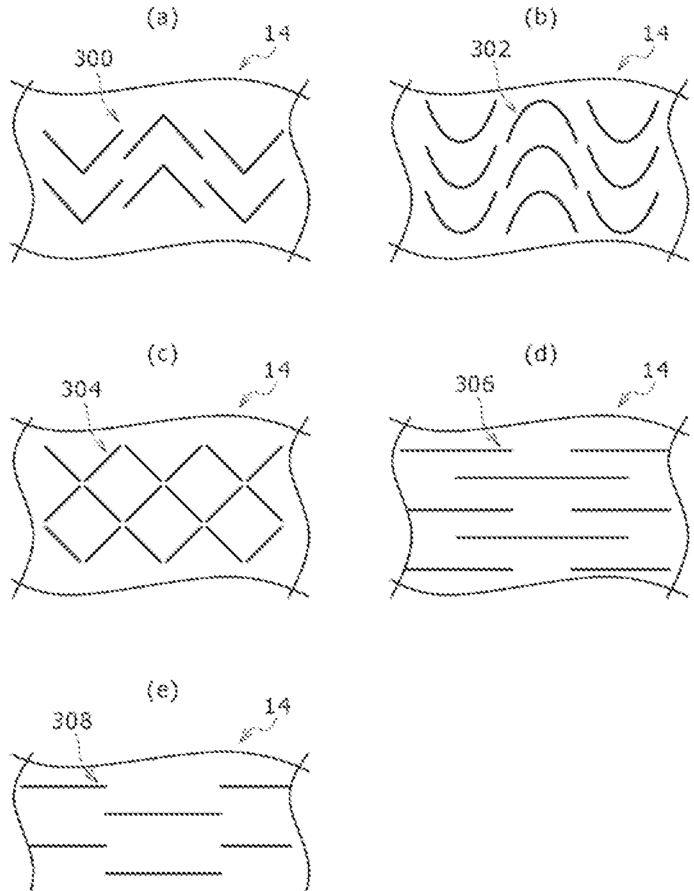

Parts (a) to (e) of FIG. 6 are diagrams corresponding to FIG. 4 in other examples of the exemplary embodiment.

Figure 7:
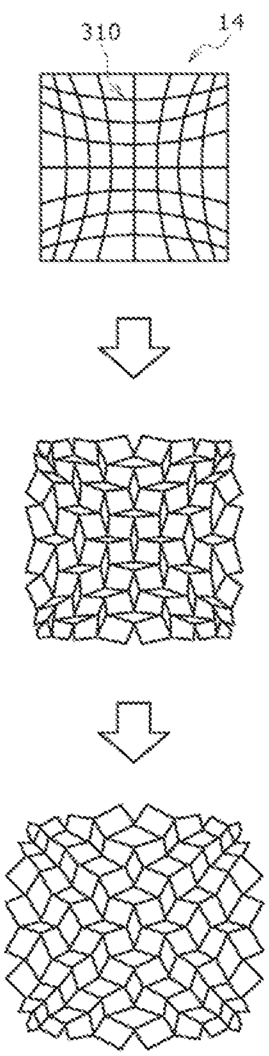

FIG. 7 is a diagram corresponding to FIG. 4 in another example of the exemplary embodiment, and is a diagram illustrating a state in which an exhaust section is deformed in accordance with an increase in pressure in the battery case.

DESCRIPTION OF EMBODIMENT

Exemplary embodiments according to the present disclosure will be described below in detail with reference to the accompanying drawings. Note that in a case where a plurality of exemplary embodiments and modified examples are included in the following, it is assumed from the beginning to construct a new exemplary embodiment by appropriately combining feature parts of them. The plurality of drawings includes schematic views, and dimensional ratios such as depth, width, and height of each member do not necessarily coincide among different drawings. Those configuration elements described in the following that are not recited in independent claims representing the highest concept are illustrated herein as optional configuration elements and are not essential. In the present description, the term “substantial/substantially” is used in the same meaning as the term “approximate/approximately,” and the requirement “substantially . . . ” is satisfied if being substantially the same.

In the following exemplary embodiment, a case where battery pack 10 has a substantially rectangular parallelepiped shape will be described as an example. In the drawings and the description of the examples, an X direction indicates the depth direction of battery pack 10 (battery case 12), a Y direction indicates the width direction of battery pack 10 (battery case 12), and a Z direction indicates the height direction of battery pack 10 (battery case 12). The X, Y, and Z directions are orthogonal to each other.

Figure 1:
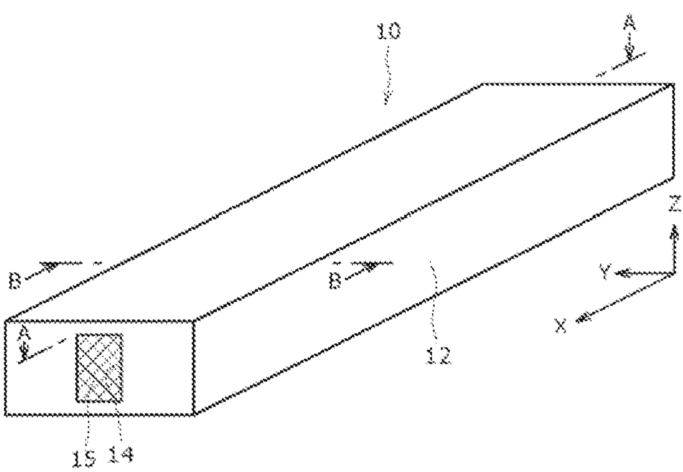
FIG. 1 is a perspective view of a battery pack that is an example of an exemplary embodiment.
Figure 2:
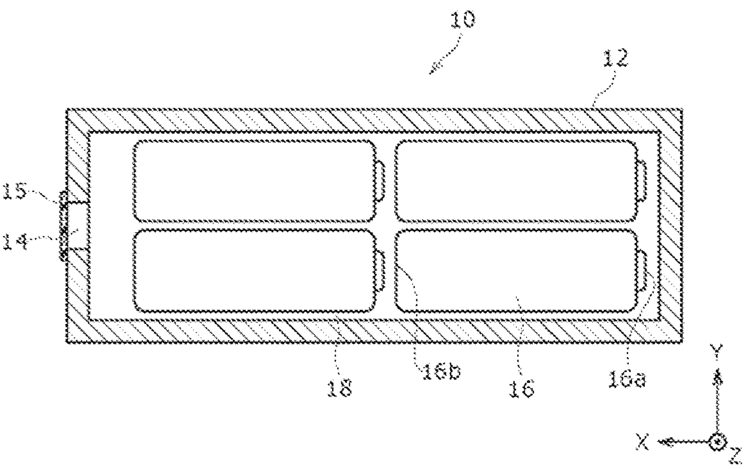
FIG. 2 is a planar cross-sectional view taken along line A-A of FIG. 1.
Figure 3:
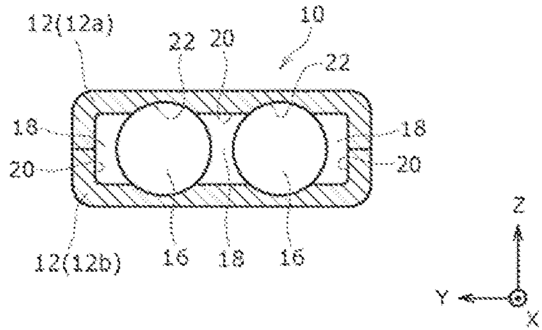
FIG. 3 is a front cross-sectional view taken along line B-B of FIG. 1.

First, an outline of battery pack 10 will be described with reference to FIGS. 1 to 3. FIG. 1 is a perspective view of a battery pack that is an example of the exemplary embodiment. FIG. 2 is a planar cross-sectional view taken along line A-A of FIG. 1 (a cross-sectional view taken along an XZ plane passing through the center of battery pack 10 in the width). FIG. 3 is a front cross-sectional view taken along line B-B of FIG. 1 (a cross-sectional view taken along a YZ plane passing through secondary battery 16 in the depth of battery pack 10). Battery pack 10 can be used as a power source for various electric devices, and may be, for example, a small-capacity battery pack for small portable devices such as a personal computer (PC) or an electric cleaner.

Battery pack 10 includes battery case 12. The shape of battery case 12 is not particularly limited, but battery case 12 may have a substantially rectangular parallelepiped shape such as that illustrated in FIG. 1. Battery case 12 is formed of a metal material or a resin material, for example. Battery case 12 has a function of protecting internally housed secondary battery 16 from dust and water.

Battery case 12 includes exhaust section 14 that exhausts gas exhausted from secondary battery 16 to the outside of battery case 12. The position, number, size, and the like at which exhaust section 14 is provided are not particularly limited, but one exhaust section 14 may be provided on a part of one side surface in the depth direction of battery case 12, such as illustrated in FIG. 1. In addition, the size of exhaust section 14 may be any size as long as gas exhausted from secondary battery 16 can be exhausted to suppress rupture of battery case 12. Although details will be described later, exhaust section 14 has a function of normally sealing the inside of battery case 12, and deforming and opening in accordance with an increase in pressure in battery case 12 during abnormality. As a result, it is possible to suppress rupture of battery case 12 while suppressing intrusion of dust and water into battery case 12.

Battery pack 10 may include covering member 15 that covers exhaust section 14. As a result, secondary battery 16 housed in battery case 12 can be more reliably protected from dust and water. Covering member 15 is fixed to battery case 12 so as to close exhaust section 14 by a fixing means such as an adhesive. Covering member 15 may be made of an air-permeable and waterproof material, such as Gore-Tex (registered trademark), that allows exhaust gas from the inside of battery case 12 to pass and blocks liquid such as water from the outside.

Battery pack 10 includes secondary battery 16 housed in battery case 12. The number, shape, size, and the like of secondary battery 16 are not particularly limited, but battery pack 10 may house a plurality of cylindrical secondary batteries 16 in battery case 12, such as illustrated in FIG. 2. Examples of secondary battery 16 include a non-aqueous electrolyte secondary battery such as a lithium ion battery. Secondary battery 16 may have positive electrode terminal 16*a* and negative electrode terminal 16*b* at respective ends in the depth. Secondary battery 16 includes, for example, an electrode group including a positive electrode and a negative electrode, an exterior can that houses the electrode group together with an electrolyte, and a sealing plate that seals an opening of the exterior can with an insulating gasket. The exterior can may be electrically connected to the negative electrode of the electrode group, and the conductive sealing plate may be connected to the positive electrode. Note that a current collecting member such as a metal plate is connected to positive electrode terminal 16*a* and negative electrode terminal 16*b* of secondary battery 16, and a connection terminal with the outside of the positive electrode and the negative electrode is provided in battery case 12. However, in FIG. 2, an electrical connecting member such as a current collecting member and a connection terminal is omitted.

As illustrated in FIG. 3, battery case 12 may include container 22 that houses secondary battery 16 in an internal space of inner wall 20 formed on a peripheral edge. An exhaust passage 18 through which a high-temperature gas exhausted from the secondary battery 16 during abnormality flows is formed between containers 22 and between container 22 and inner wall 20. Exhaust passage 18 is a passage for gas exhausted from secondary battery 16, and may be cooled by mixing with the air in exhaust passage 18 when the gas flows through exhaust passage 18. For example, in FIG. 2, when the sealing plate near the positive electrode terminal 16*a* of secondary battery 16 is designed to be broken before the exterior can, high-temperature gas exhausted from secondary battery 16 passes through exhaust passage 18 over a long distance before reaching exhaust section 14, so that the temperature of the gas can be efficiently lowered. Note that the exterior can may be designed to be broken, and it is preferable that the exterior can be designed to be broken after the sealing plate has been broken.

As illustrated in FIG. 3, battery case 12 may be divided into two half cases 12*a*, 12*b* in the height. By overlapping half cases 12*a*, 12*b* in a state of facing each other, secondary battery 16 can be entirely covered. In half cases 12*a*, 12*b*, only the tip of inner wall 20 abuts, and the tips of parts other than inner wall 20 face each other with a space therebetween. Thus, a space is formed in battery case 12, and this space is exhaust passage 18.

Next, exhaust section 14 will be described in detail with reference to FIGS. 4 to 7.

FIG. 4 is an enlarged view of a part of exhaust section 14 in an example of the exemplary embodiment. Exhaust section 14 has at least one slit 30, and preferably has a plurality of slits 30 as illustrated in FIG. 4. Slits 30 are thin lines penetrating exhaust section 14 in the thickness. Note that slits 30 need not penetrate over their entire length, and a part thereof may be non-penetrating. The width of slits 30 is, for example, 5 μm to 2 mm, preferably 30 μm to 1 mm. The thickness of exhaust section 14 is not particularly limited as long as slits 30 can be opened during abnormality as described later.

As illustrated in FIG. 4, slits 30 each have the same shape with pointed bent parts 30*a*, 30*b*, and may be aligned such that the directions of bent parts 30*a*, 30*b* are aligned in the longitudinal direction and are alternately opposite in the lateral direction. Since bent parts 30*a*, 30*b* of slits 30 are pointed, when the slits 30 part is opened as described later, covering member 15 is broken and gas can be more easily exhausted from exhaust section 14. In addition, the plurality of slits 30 may overlap in the lateral direction as illustrated in FIG. 4. The larger overlap width w is, the larger the opening can be widened with respect to the pressure in battery case 12 during abnormality.

Since exhaust section 14 has slits 30, the slits 30 part is preferentially deformed along with deformation of exhaust section 14 occurring in accordance with an increase in pressure in battery case 12. Therefore, when gas is exhausted from secondary battery 16, the pressure in battery case 12 increases, and exhaust section 14 is pushed from the inside of battery case 12, so that the slits 30 part is opened, and the gas can be exhausted from exhaust section 14 to the outside.

FIG. 5 is a cross-sectional view taken along line C-C of FIG. 4. Part (a) of FIG. 5 illustrates a normal state in which the pressure in battery case 12 is low, and (b) of FIG. 5 illustrates an abnormal state in which the pressure in battery case 12 has increased. Part (c) of FIG. 5 is a cross-sectional view taken along line D-D of FIG. 4 in an abnormal state in which the pressure in battery case 12 has increased. As illustrated in (a) of FIG. 5, exhaust section 14 is normally substantially flat, and the width of slits 30 in bent parts 30*a*, 30*b* is narrowed to such an extent that it is possible to suppress entry of dust and water into battery case 12. However, as illustrated in (b) of FIG. 5, exhaust section 14 during abnormality receives pressure from the inside of battery case 12, slits 30 are pushed to the outside, the width of slits 30 in bent parts 30*a*, 30*b* is increased, and gas g exhausted from secondary battery 16 is exhausted. This can suppress rupture of battery case 12. In addition, since the bending directions of the bent parts of the plurality of slits 30 are opposite for each adjacent row, as illustrated in (b) and (c) of FIG. 5, the direction in which gas g is exhausted can be differentiated for each adjacent row of slits 30, so that it is possible to reduce the concentration of gas g outside the vicinity of exhaust section 14 and to reduce the risk of combustion of gas g.

In exhaust section 14, slits 30 preferably reversibly operate due to the pressure in battery case 12. That is, when gas is exhausted and the pressure in battery case 12 decreases, slits 30 preferably return to normal positions. As a result, since the sealed state can be maintained again after exhaust, it is possible to suppress the spread of fire of secondary battery 16 due to inflow of air from the outside.

Exhaust section 14 is preferably made of an aluminum material or a stainless steel material. As a result, exhaust section 14 is less likely to be corroded by gas exhausted from secondary battery 16, and can operate stably. Further, since aluminum and stainless steel are easily elastically deformed, a deformation range in which exhaust section 14 can reversibly operate can be made relatively wide.

Next, other examples of exhaust section 14 will be described with reference to FIG. 6. Parts (a) to (e) of FIG. 6 are diagrams corresponding to FIG. 4 in the other examples of the exemplary embodiment.

In (a) of FIG. 6, slits 300 each have the same shape with pointed bent parts, and are aligned such that the directions of the bent parts are aligned in the longitudinal direction and are alternately opposite in the lateral direction. In addition, the plurality of slits 300 do not overlap in the lateral direction.

In (b) of FIG. 6, slits 302 each have the same shape with round bent parts 30*a*, 30*b*, and are aligned such that the directions of the bent parts are aligned in the longitudinal direction and are alternately opposite in the lateral direction. In addition, the plurality of slits 302 do not overlap in the lateral direction. As illustrated in (a) and (b) of FIG. 6, when the slits do not overlap each other in the lateral direction, exhaust section 14 is relatively less likely to be deformed, and thus, is likely to operate reversibly in accordance with the pressure in battery case 12.

In (c) of FIG. 6, linear slits 304 having the same length and facing two directions orthogonal to each other are periodically aligned, so that the assembly of slits 304 forms a lattice pattern. In this case, the exhaust direction of gas g during abnormality as illustrated in (b) of FIG. 5 is likely to be aligned in the same direction. However, in a case where the concentration of gas g outside the periphery of exhaust section 14 is sufficiently low and the risk of combustion of gas g is low, exhaust section 14 may have such an assembly of slits 304.

In (d) of FIG. 6, each slit 306 has a linear shape extending in the lateral direction and having the same length, and is aligned such that both ends thereof are aligned in the longitudinal direction and heights thereof in the longitudinal direction are aligned every other line in the lateral direction. In addition, the plurality of slits 306 overlap in the lateral direction.

In (e) of FIG. 6, each slit 308 has a linear shape extending in the lateral direction and having the same length, and is aligned such that both ends thereof are aligned in the longitudinal direction and heights thereof in the longitudinal direction are aligned every other line in the lateral direction. In addition, the plurality of slits 308 do not overlap in the lateral direction. As illustrated in (d) and (e) of FIG. 6, when slits 306, 308 have a linear shape, the slits can be relatively easily manufactured.

The slits illustrated in FIG. 4 and (a) to (e) of FIG. 6 are examples, and exhaust section 14 may include a plurality of types of slits with different shapes.

Next, another example of exhaust section 14 will be described with reference to FIG. 7. FIG. 7 is a diagram corresponding to FIG. 4 in another example of the exemplary embodiment, and is a diagram illustrating a state in which exhaust section 14 is deformed in accordance with an increase in pressure in battery case 12. In FIG. 7, the upper diagram illustrates exhaust section 14 normally. A plurality of slits 310 are formed in exhaust section 14 in each of the longitudinal direction and the lateral direction, and the pattern formed by slits 310 is rotationally symmetrical by 90°, vertically symmetrical, and horizontally symmetrical. When the pressure in battery case 12 increases, exhaust section 14 is deformed as shown in the middle diagram and the lower diagram to form openings, so that gas exhausted from secondary battery 16 can be exhausted. Exhaust section 14 having slits 310 with the configuration illustrated in FIG. 7 can reversibly operate while widening the openings.

REFERENCE MARKS IN THE DRAWINGS

- 10: battery pack
- 12: battery case
- 12*a*, 12*b*: half case
- 14: exhaust section
- 15: covering member
- 16: secondary battery
- 18: exhaust passage
- 20: inner wall
- 22: container
- 30, 300, 302, 304, 306, 308, 310: slit
- 30*a*, 30*b*, 30*c*, 30*d*: bent part

The invention claimed is:

1. A battery pack comprising:

a secondary battery; and a battery case that houses the secondary battery, wherein the battery case includes an exhaust section through which gas discharged from the secondary battery is exhausted to outside of the battery case, the exhaust section includes a plurality of slits and a deformable region located between the plurality of slits, each of the plurality of slits comprises a through-opening, and the through-opening is brought into an open state in response to discharge of the gas and is brought into a closed state having a smaller degree of opening than the open state when the discharge of the gas does not occur.

2. The battery pack according to claim 1, wherein the exhaust section contains an aluminum material or a stainless steel material.

3. The battery pack according to claim 1, wherein at least one of the plurality of slits includes a linear shape.

4. The battery pack according to claim 1, wherein at least one of the plurality of slits includes a bent portion.

5. The battery pack according to claim 1, wherein the plurality of slits overlap.

6. The battery pack according to claim 1, further comprising a covering member which covers the exhaust section.

7. The battery pack according to claim 6, wherein the covering member contains an air-permeable and waterproof material.

8. The battery pack according to claim 1, wherein a width of the through-opening is equal to or greater than 5 μm and equal to or less than 2 mm.

9. The battery pack according to claim 1, wherein a width of the through-opening is equal to or greater than 30 μm and equal to or less than 1 mm.

10. The battery pack according to claim 1, wherein the through-opening is brought into the open state in response to discharge of the gas as the deformable region deforms in a thickness direction of the exhaust section.

11. The battery pack according to claim 1, wherein deformation of the deformable region reversibly changes a shape of the deformable region while being supported at least by two opposing portions of the exhaust section, the opposing portions facing each other across the deformable region.

* * * * *